United States Patent [19]

Shingaki et al.

[11] Patent Number: 5,495,351
[45] Date of Patent: Feb. 27, 1996

[54] LIQUID CRYSTAL DEVICE WITH TWO MONOSTABLE LIQUID CRYSTAL CELLS

[75] Inventors: Junko Shingaki, Atsugi; Shuzo Kaneko, Yokohama; Katsumi Kurematsu, Kawasaki; Hideaki Mitsutake, Tokyo, all of Japan

[73] Assignee: Canon Kabushiki Kaisha, Tokyo, Japan

[21] Appl. No.: 284,267

[22] Filed: Aug. 2, 1994

Related U.S. Application Data

[63] Continuation of Ser. No. 788,260, Nov. 5, 1991, abandoned.

[30] Foreign Application Priority Data

| Nov. 9, 1990 | [JP] | Japan | 2-302476 |
| Nov. 22, 1990 | [JP] | Japan | 2-315850 |
| Nov. 30, 1990 | [JP] | Japan | 2-330134 |
| Oct. 3, 1991 | [JP] | Japan | 3-256550 |

[51] Int. Cl.$^6$ ............. G02F 1/133; G02F 1/1343; G02F 1/13
[52] U.S. Cl. ............. 359/53; 359/56; 359/59; 359/100
[58] Field of Search ............. 359/53, 56, 59, 359/100

[56] References Cited

U.S. PATENT DOCUMENTS

| 4,367,924 | 1/1983 | Clark et al. | 350/334 |
| 4,655,561 | 4/1987 | Kanbe et al. | 350/350 S |
| 4,763,994 | 8/1988 | Kaneko et al. | 350/336 |
| 4,796,980 | 1/1989 | Kaneko et al. | 350/350 S |
| 4,836,656 | 6/1989 | Mouri et al. | 350/350 S |
| 4,840,462 | 6/1989 | Hartmann | 350/350 S |
| 5,006,839 | 4/1991 | Fujita | 359/56 |
| 5,013,137 | 5/1991 | Tsuboyama et al. | 359/56 |
| 5,069,532 | 12/1991 | Taylor, Jr. | 359/56 |
| 5,126,864 | 6/1992 | Akiyama et al. | 359/53 |
| 5,168,381 | 12/1992 | Walba | 359/53 |
| 5,214,523 | 5/1993 | Nito et al. | 359/78 |

FOREIGN PATENT DOCUMENTS

| 61-290420 | 12/1986 | Japan | 359/53 |

*Primary Examiner*—William L. Sikes
*Assistant Examiner*—Ron Trice
*Attorney, Agent, or Firm*—Fitzpatrick, Cella, Harper & Scinto

[57] ABSTRACT

A liquid crystal device comprising a liquid crystal cell including a plurality of pixels aligned on a plurality of lines and rows, each of the pixels composed of a pair of electrodes and liquid crystals provided between the pair of electrodes; and an optical unit including high-refractive portions positioned corresponding to the pixels, and low-refractive portions positioned next to the high-refractive portions on a plane, the high-refractive portions and the low-refractive portions having the refractive indexes the ratio between which satisfies the condition for total reflection of incident light. Another embodiment is a liquid crystal device comprising two liquid crystal cells wherein each of the cells exhibit monostable orientation.

7 Claims, 11 Drawing Sheets

$\theta_T = 22.5°$

LIQUID CRYSTAL DEVICE WITH TWO MONOSTABLE LIQUID CRYSTAL CELLS

This application is a continuation of application Ser. No. 07/788,260, filed Nov. 5, 1991, now abandoned.

BACKGROUND OF THE INVENTION

1. Field of the Invention

The present invention relates to a liquid crystal device comprising ferroelectric liquid crystals as well as a backlight.

2. Description of the Related Art

Liquid crystal display devices utilizing the electro-optic effect of liquid crystals to display pixels have been developed. One such device, ferroelectric liquid crystal (FLC), is expected to be used in many applications because of its quick responsiveness. One of these applications, a domain graduation method, has been proposed by Philips in U.S. Pat. No. 4,840,462. In this method, in order to provide halftones in a TFT(thin film transistor)/FLC combination, the area of the domain inversion is varied by controlling the amount of electricity applied to pixel electrodes.

However, this method has problems because the bistable FLCs require black reset. That is, in driving, complicated signal processing is required and in a small pixel, graduation levels available are limited by the size of the smallest white-inverted domains.

Another TFT/FLC method, employing FLC having a helix pitch, has been proposed in Japan Display '89 (1989), p.174, in which two states, i.e., the helical scatter state and the transparent state caused by voltage application, are alternated. This method has a problem in that different levels of voltage are required to coil and to uncoil the helix, causing hysteresis in the V-T (voltage-transmittance) characteristic.

A surface stabilized FLC device (referred to as "SSFLC device") proposed by Clark and Lagerwall in U.S. Pat. No. 4,367,924 is a bistable FLC device having two stable alignment states. With the bistable FLC cells, which invert from one state to the other when voltage is applied, halftone display is difficult, except in the domain graduation method as proposed by Philips.

Also, it is known that monostable mono-domain FLC cells are produced by aligning the molecules asymmetrically on upper and lower substrates, and that when DC voltage is applied to the cells so that dipoles of spontaneous polarization invert, the molecule axes rotate a certain amount. In this phenomena, domain inversion does not occur during the molecule axis rotation, so that complete halftones can be provided. However, an image will not be produced on an actual panel because the molecules turn back to the original state immediately when the applied writing pulses are discontinued. If appropriate DC field is maintained for a certain time, for example, by active switching units such as thin film transistors (TFT) provided with the cells, a desired image can be displayed. This technique is based on a principle that when a ferroelectric liquid crystal device having one stable state (hereinafter, referred to as "monostable FLC device") is supplied with a predetermined level of voltage, the FLC molecule axes turn according to the level of voltage, and when the applied voltage is discontinued, the molecules turn back to the original stable state by their own orientation force.

This technique will be described in detail.

With reference to FIG. 12, illustrating a sectional view of a liquid crystal cell of a liquid crystal device, an insulating film 1212 for preventing a short circuit between upper and lower electrodes is formed by the RF-sputter method on a glass substrate for liquid crystals 1210 having a transparent conductive film 1211. An orientation film 1213 is formed on the insulation layer 1212 by sintering polyimide which is applied to a thickness of approximately 5 nm by a spinner. After being sintered, the orientation film 1213 is rubbed by a normal method.

The other substrate 1222 has transistors composed of gate electrodes 1217, a gate insulating film 1218, source electrodes 1220, drain electrodes 1221 and a-Si semiconductor layers 1219, and display electrodes 1216 connected to the transistors. An insulating film 1215 for protecting the channels of the transistor portions is provided on top of this layered structure. On top of the insulating film 1215, a liquid crystal orientation film 1214 is formed in the same way orientation film 1213 is formed. The orientation film 1214 is also rubbed by a normal method after being sintered. The cell gap is maintained by a spacer 1223 having a grain size of about 1.7 μm.

FIG. 13 shows one example of the driving waveforms in the device constructed as the above description. In this example, an information signal $V_{OP}$ is charged through a TFT to the cell when the gate pulse $V_G$ is on. Though the voltage $V_{OP}$ decays because of resistance in the liquid crystal layers, the liquid crystal molecule axes turn to let light pass, according to the voltage $V_{OP}$. When the voltage $V_{OP}$ becomes zero, the molecule axes turn back to block light.

FIG. 14 illustrates the relation between the FLCs and a polarizer in the stable state without voltage being applied. When the polarization axes of the polarizer P and an analyzer A are perpendicular to each other and the directions of the polarizer P and the liquid crystal molecules in the stable state are the same, zero or negative voltage provides the black state. Positive voltage moves the molecules smoothly to a position, as shown by a broken line in FIG. 14, according to amount of positive voltage, and thus the light double-refracted by the polarization passes through the FLC device.

In an intermediate transmittance range, no domain inversion occurs so that complete halftones can be obtained. When the applied voltage is shifted to zero, the molecules return to the black state, i.e., the stable state, in less than several milliseconds since the liquid crystal cell is monostable. An absolute transmittance T in a double refraction cell is obtained from the following equation.

$$T = \sin^2 2\theta \sin^2(\Delta n d\pi/\lambda)$$

where: θ is tilt angle (see FIG. 4. Δn is anisotropy of refractive index; d is cell thickness; and λ is wave length. Since Δnd/λ is approximately ½, the equation is approximately $$T = \sin^2 2\theta$$

The tilt angle providing the maximum transmittance in this example was 36°, so that the absolute transmittance in the liquid crystal portion is about 90% based on the equation.

$$T' = \sin^2(2 \times 36°) = 0.905$$

In the black state, the tilt angle never becomes greater in the negative direction even if a negative voltage is applied.

It is known that when the driving is carried out by the waveform shown in FIG. 13 and only positive voltage $V_{LC}$ is applied to the liquid crystal cell portions, the average luminance deteriorates as time passes (which is longer than the gate pulse interval). This luminance deterioration is different from the deterioration of the information signal voltage $V_{OP}$ caused by resistance of the liquid crystal layer and the like, shown in FIG. 13.

In order to reduce the luminance deterioration in the conventional art, a method can be applied, in which display a signal and non-display signal (the ground potential or a potential having a polarity different from that of the display signal) are applied alternatively in a constant cycle and constant periods by a voltage applying means. The display signal is the voltage according to image signals applied to the pixels. The non-display signal is signal voltage having no relation with the image.

However, when a black/white alternate driving method employing the non-display signal unit is used in a TV or the like, one pixel displays black half of the time. Therefore, there is a disadvantage in that the panel transmittance per period of one panel is half of that by means of a driving method without the non-display signal unit (the conventional art).

The bistable ferroelectric liquid crystal (FLC) device has two stable states in directions shifted a certain angle both ways from the axis direction (rubbing direction or the like) of the orientation operating surface, which is formed by the rubbing method or the like on the liquid-crystal-side surfaces of boards on both sides of the liquid crystal layer. The tilt angle is called a cone angle (hereinafter referred to by $\theta c$). When voltage is applied perpendicularly to the liquid crystal layer of the FLC device, the FLCs shift from one stable state to the other. This shift corresponds to the $2\theta c$ rotation of the optical axis of a material having anisotropy of refraction index. Therefore, when polarized light comes into the bistable FLC device having a thickness corresponding to the operation of a half-wavelength board, the circular polarization effect to the incoming polarized light in one stable state is $4\theta c$ different from that in the other stable state. When the bistable FLC device is placed between polarizers (such as polarizing plates) of crossed nicols or parallel nicols, an ON/OFF ratio of transmitted-light quantity, i.e., transmittance ratio, contrast, between the two stable states reaches a maximum if $4\theta c=90°$ ($\theta c=22.5°$).

However, the cone angle is greatly dependent on the characteristics of a liquid crystal material and the orientating operation surface, so that an FLC device having a sufficient cone angle has yet to be developed. Thus, the modulation degree of the conventional art is insufficient for an optical modulating device.

One method to solve the above problem is described in U.S. patent application No. 673,070 (Mar. 21, 1991), in which two FLC devices capable of optical modulation and one half-wavelength plate are combined.

With this method, the cone angle of 11.25° gives rise to the maximum ON/OFF ratio of transmitted light-quantity, i.e., the transmittance ratio, the contrast.

However, since each of the two liquid crystal devices is sandwiched between two transparent plates (which are usually glass plates having a thickness of about 1 mm), the distance between the two liquid crystal layers is greater than the size of the pixels in a high density display device; for example, when a liquid crystal device having a diagonal size of three inches is used in a projecting display apparatus for an EDTV, one side of a pixel in the device will be about 60 μm. Therefore, problems occurs, such as decrease in the practical numerical aperture and light leakage from one pixel to another. The half-wavelength plate employed in the conventional art may also give rise to the same problems.

SUMMARY OF THE INVENTION

It is an object of the present invention is to solve the above problems by providing an optical modulator which can be a component of a display device wherein luminance deterioration with the passing of time is prevented without affecting the luminance obtained at the starting phase in the conventional art which does not have non-display signal unit.

Another object of the present invention is to provide a liquid crystal device which prevents light leakage.

Still another object of the present invention is to provide a liquid crystal device which utilizes light more efficiently.

One aspect of the present invention is a liquid crystal device comprising:

a) liquid crystal cells of two types, each of which exhibits one stable molecular orientation of chiral smectic liquid crystal when there is no applied electric field, and exhibits another molecular orientation different from the stable molecular orientation when there is an applied voltage of one polarity and exhibits the stable molecular orientation when there is an applied voltage of the other polarity or no applied voltage, and both of which have the stable molecular orientations substantially in one direction and also have the other orientations substantially in another direction;

b) a polarizer whose optical axis is substantially parallel to the direction of either the stable or the other molecular orientation, and an analyzer whose optical axis is not parallel to the optical axis of the polarizer; and c) a voltage applying means which applies voltage of one polarity to one of the cells while applying voltage of the other polarity or zero voltage to the other cell.

Another aspect of the present invention is a liquid crystal device comprising:

a) a liquid crystal cell including a plurality of pixels aligned on a plurality of lines and rows, each of the pixels composed of a pair of electrodes and liquid crystals provided between the pair of electrodes;

b) an optical means including high-refractive portions positioned corresponding to the pixels, and low-refractive portions positioned next to the high-refractive portions on a plane, the high-refractive portions and low-refractive portions having the refractive indexes the ratio between which satisfies the condition for total reflection of incident light.

Still another aspect of the present invention is a liquid crystal device comprising:

a) a first liquid crystal cell including a pair of substrates which have electrodes and each of which is treated by the monoaxial alignment technique in one direction, and chiral smectic liquid crystals positioned between the pair of substrates;

b) a second liquid crystal cell including a pair of substrates which have electrodes and each of which is treated by the monoaxial alignment technique in a direction different from the direction of the monoaxial alignment technique used in the first cell, and chiral smectic liquid crystals positioned between the pair of substrates; and c) an optical discriminating means including an analyzer and a polarizer.

DETAILED DESCRIPTION OF THE PREFERRED EMBODIMENTS

In order to achieve the object of the present invention, an optical modulating device, in which polarization, scattering or transmission of light is changed by controlling the applied electric field, comprises a two-layer structure of controlled portions (optical modulating layers) and a voltage applying means for applying alternately a display signal and a non-display signal in a constant cycle and periods to each of the controlled layers so that the layers experience opposite phases. The display signal is the voltage according to image signals applied to pixels. The non-display signal is the signal voltage having no relation with an image.

A pair of facing substrates having liquid crystal therebetween can be used as an optical modulating layer according to the present invention.

In such a fabrication, a reproduced image will provide the same level of brightness as an image reproduced by driving method without a non-display signal unit does. Also, progressive deterioration in the average luminance of the optical response of an optical modulating layer such as a liquid crystal layer can be reduced.

Figure 1:
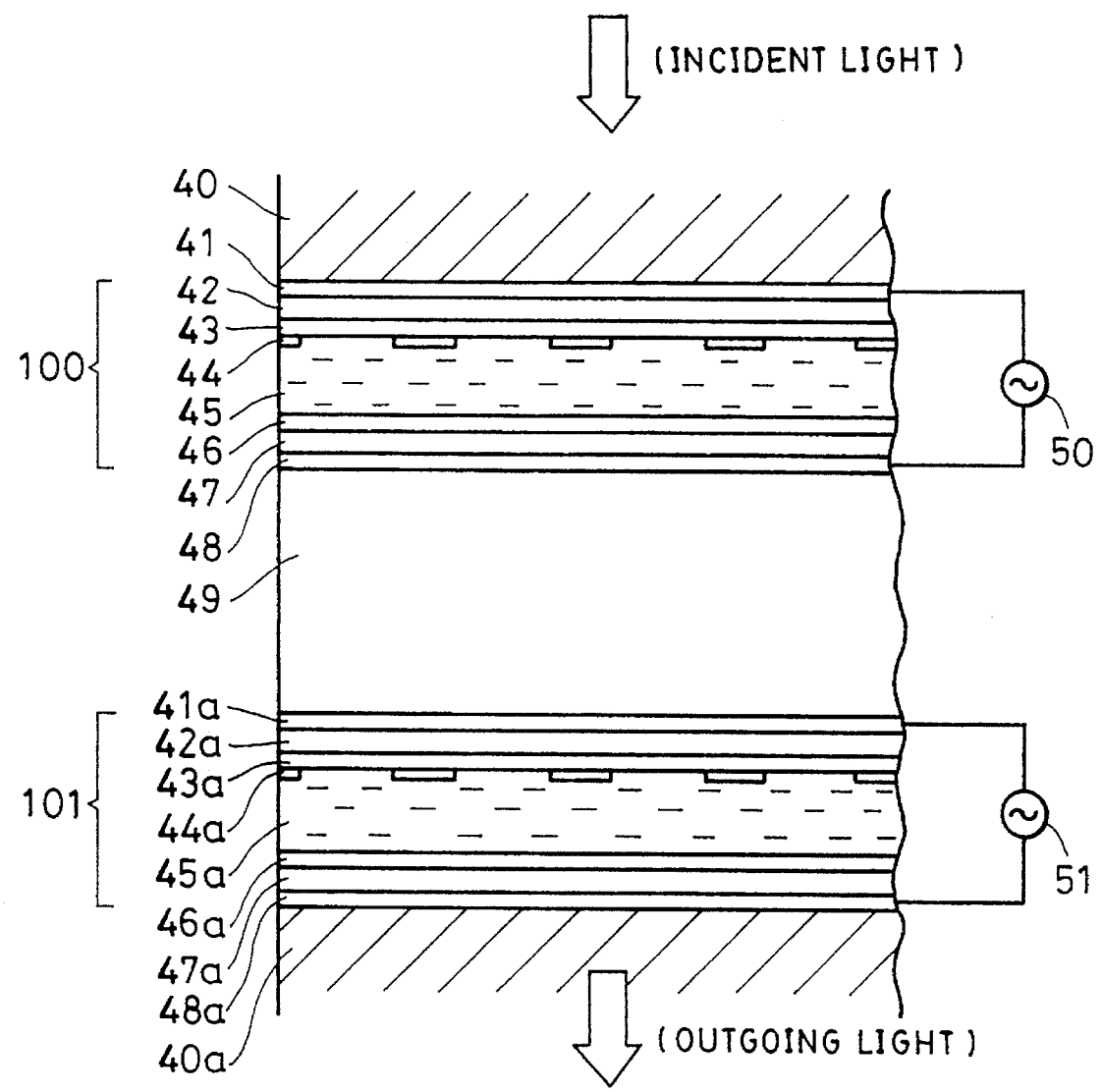
FIG. 1 is a sectional view of an optical modulating device according to a first embodiment of the present invention.

With reference to FIG. 1, a liquid crystal cell according to a first embodiment of the present invention comprises a first liquid crystal device 100 including: (from the incident-light side) a transparent glass substrate 40 (about 1 mm thick); a transparent ITO (indium tin oxide) film 41 (about 150 nm thick) which functions as an electrode; an insulating film ($SiO_2$, $TiO_2$, $Ta_2O_5$) 42 (about 120 nm thick) for preventing a short circuit to the counter electrode 48; a polyimide film 43 (about 20 nm thick) rubbed for orientating a first liquid crystals (FLC) 45; protruding portions 44 of TFTs; the first liquid crystal layer 45 injected into a gap maintained by spacers (not shown) having grain sizes of 1 to 2 μm; a polyimide film 46, the same as the polyimide film 43; an insulating film ($SiO_2$, $TiO_2$, $Ta_2O_5$) 47 (about 120 nm thick) for preventing a short circuit to the counter electrode 41; the electrode 48 facing the ITO film 41 (the counter electrode); a transparent glass substrate 49 (about 1 mm thick) provided between the first and a second liquid crystal layers 45 and 45a, and further comprises: a second liquid crystal device 101 fabricated in the same way as the first liquid crystal device 100; an AC power source 50 for controlling the first liquid crystal layer 45; an AC power source 51 whose phases are opposite to those of the AC power source 50 and which controls the second liquid crystal layer 45a.

Figure 2:
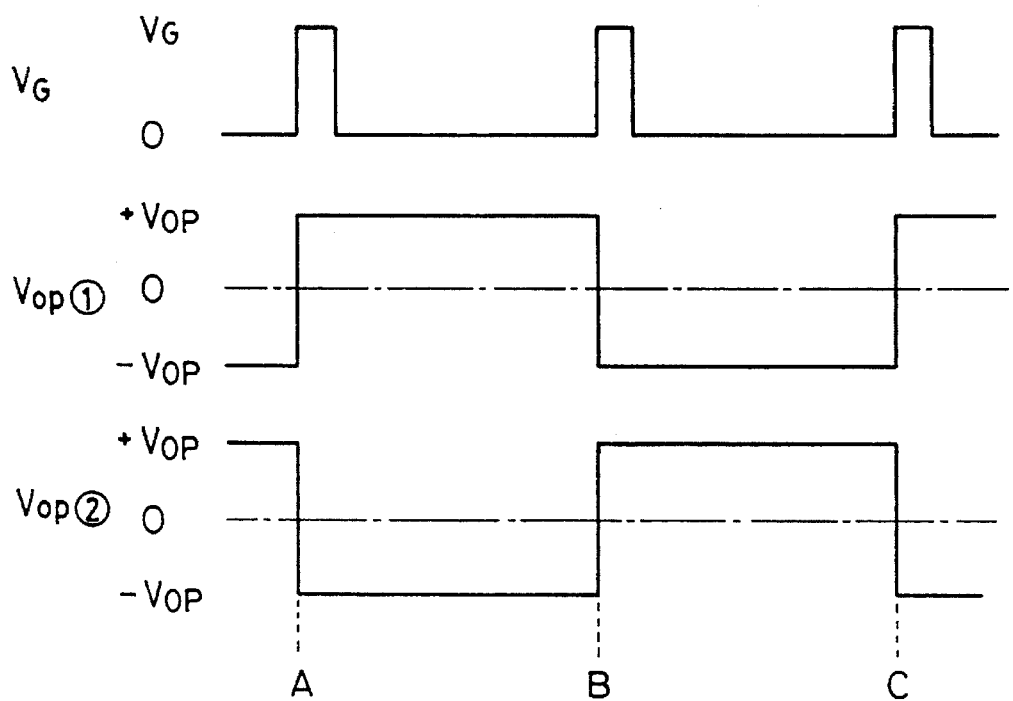
FIG. 2 shows one example of waveforms of applied voltage in the device shown in FIG. 1.

With reference to FIG. 2 illustrating driving waveforms of the cell in FIG. 1, $V_G$ is gate voltage in TFT; $V_{OP1}$ is information signal voltage applied to the first liquid crystal layer 45; and $V_{OP2}$ is information signal voltage applied to the second liquid crystal layer 45a. The information signal voltage $V_{OP1}$ between time points A and B is referred to as a display signal; that between time points B and C is referred to as a non-display signal.

As shown in FIG. 2, the gate voltage $V_G$ becomes on at constant intervals (at time points A, B and C in the figure). Synchronously at time point A, the information signal voltage $V_{OP1}=+V_{OP}$ is applied to a portion in the first liquid crystal layer 45, i.e., a portion composing a certain pixel, until time point B (display signal period). The final transmittance of the pixel is determined by a light modulating rate according to the voltage $+V_{OP}$. Also, at time point A, the information signal voltage $V_{OP2}=-V_{OP}$ is applied to a portion in the second liquid crystal layer 45a, i.e., a portion composing the above-mentioned pixel, until time point B (non-display signal period), causing the light modulating ratio to be zero. At time point B, the information signal voltages $+V_{OP}$ and $-V_{OP}$ applied to the liquid crystal layers 45 and 45a are reversed, so that the final transmittance of the pixel is determined by the light modulating rate in the portion in the second liquid layer 45a (now receiving the voltage $+V_{OP}$).

Thus, the two liquid crystal layers driven by the method according to this embodiment can provide a panel transmittance per unit of time close to 1, whereas only one liquid crystal layer driven by the black/white alternating method exhibiting non-display signal periods provides 0.5 of such transmittance. Also, since each of the liquid crystal layers is driven by the black/white alternating method, the average luminance does not deteriorate with time passing and a constant transmittance corresponding to an applied signal can be provided for a long time.

Figure 3:
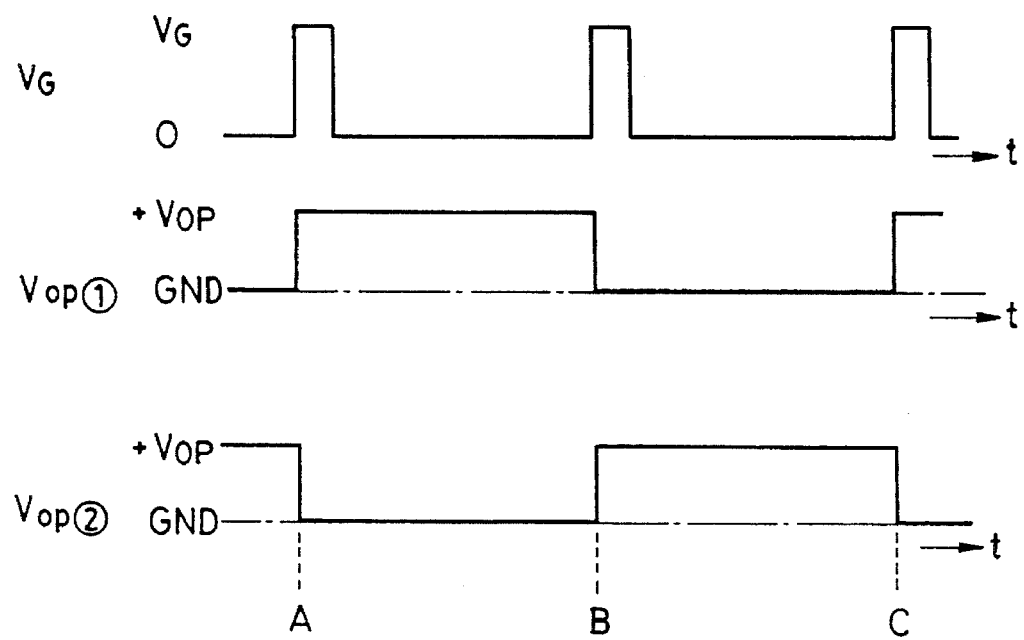
FIG. 3 shows another example of waveforms of applied voltage in the device shown in FIG. 1.

The information signal voltage $V_{OP1}$, $V_{OP2}$ during the non-display periods may be GND level (=0) as shown in FIG. 3, which still provides substantially the same effect as described above.

Figure 4:
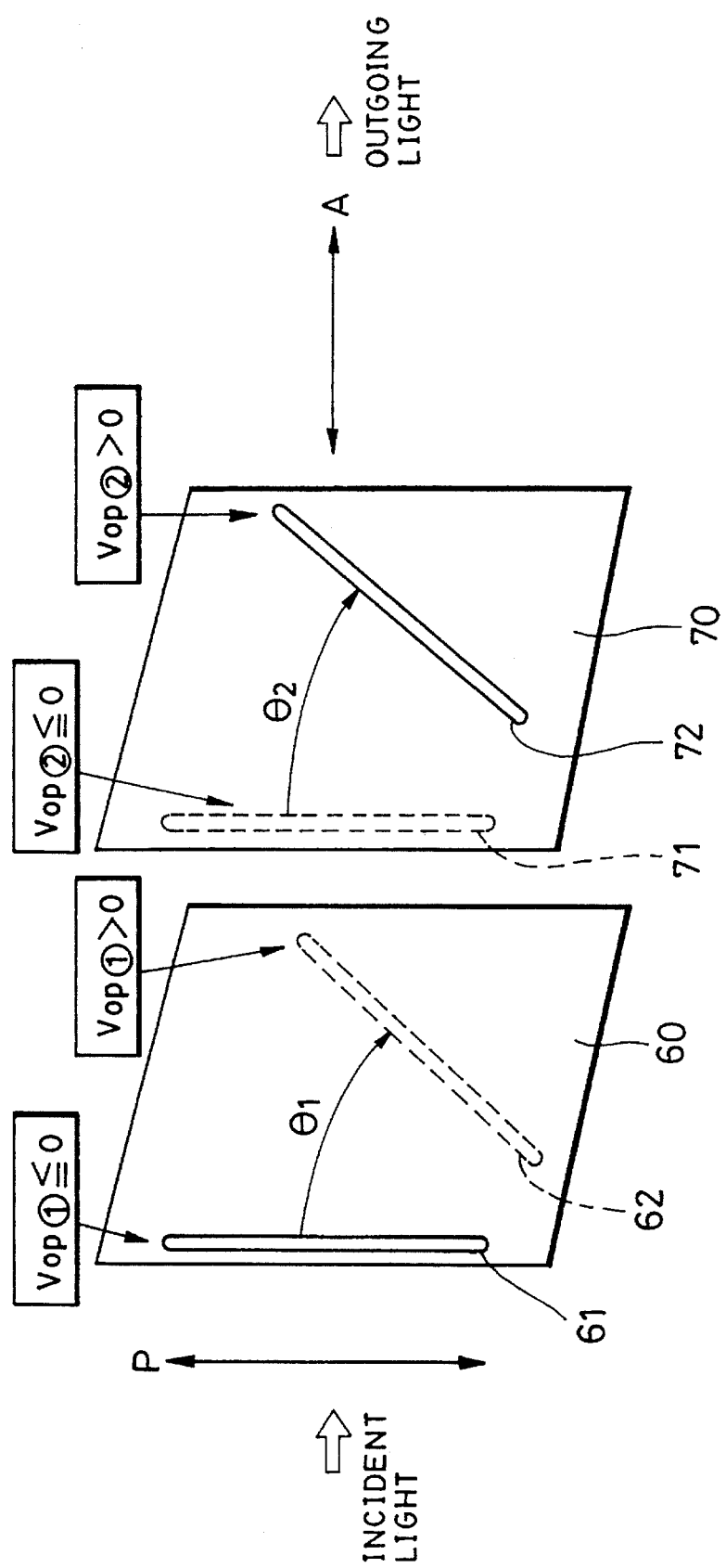
FIG. 4 illustrates an optical modulating device according to a second embodiment of the present invention.

FIG. 4 illustrates the relation between the axes of the liquid crystal molecules and the polarizer in an example in which the liquid crystal layers in FIG. 1 are monostable FLC layers. The numerals denote the following: 60, a first liquid layer; 61, a liquid crystal molecule aligned in a stable state without voltage being applied; 62, the liquid crystal molecule in a stable state with a certain voltage being applied ($\theta_1$ rotation angle of the molecule axis); 70, a second liquid crystal layer; 71, a liquid crystal molecule aligned in a stable state without voltage being applied; 72, the liquid crystal molecule in a stable state with a certain voltage being applied ($\theta_2$ rotation angle of the molecule axis).

The direction of the transmission axis of the polarizer P and the directions of the molecules aligned in the stable state 61, 71 without voltage being applied are the same in FIG. 4. When a certain pixel receives voltage distributed as after time point B in FIGS. 2 or 3 (when the first layer portion of the pixel receives negative or zero voltage and the second layer portion receives positive voltage), the light polarized by a polarizer P passes without being circularly polarized through the first liquid layer 60 where the molecules are aligned in the stable state 61, and then the light is circularly polarized by the angle $2\theta_2$ in the second liquid crystal layer 70 where the molecules are in the stable state 72, and finally a component of the polarized light in the direction of the transmission axis of an analyzer A is let out. The transmission axis directions of the polarizer P and analyzer A are in a crossed nicol state. The final transmittance of the liquid crystal cell is determined by the level of voltage $+V_{OP2}$ applied to the second liquid crystal layer during the display signal period. When voltage is applied as after time point C, the stable state of the molecules in the first and second liquid crystal layers 60, 70 become as shown by broken lines 62, 72. The polarized light is circularly polarized by $-2\theta_1$ in the liquid crystal cell, and the final transmittance of the liquid crystal cell is determined by the level of voltage $+V_{OP1}$ applied to the first liquid crystal layer 60 during the display signal period. Thus, this embodiment can provide substantially the same effect as the first embodiment does.

The transmission axis directions of the polarizer P and analyzer A are not necessarily in the crossed nicol state, and the directions of the liquid crystal molecules aligned in the stable state in the two layers without voltage being applied or the directions of the molecule rotations are not restricted by this embodiment, either.

Figure 5:
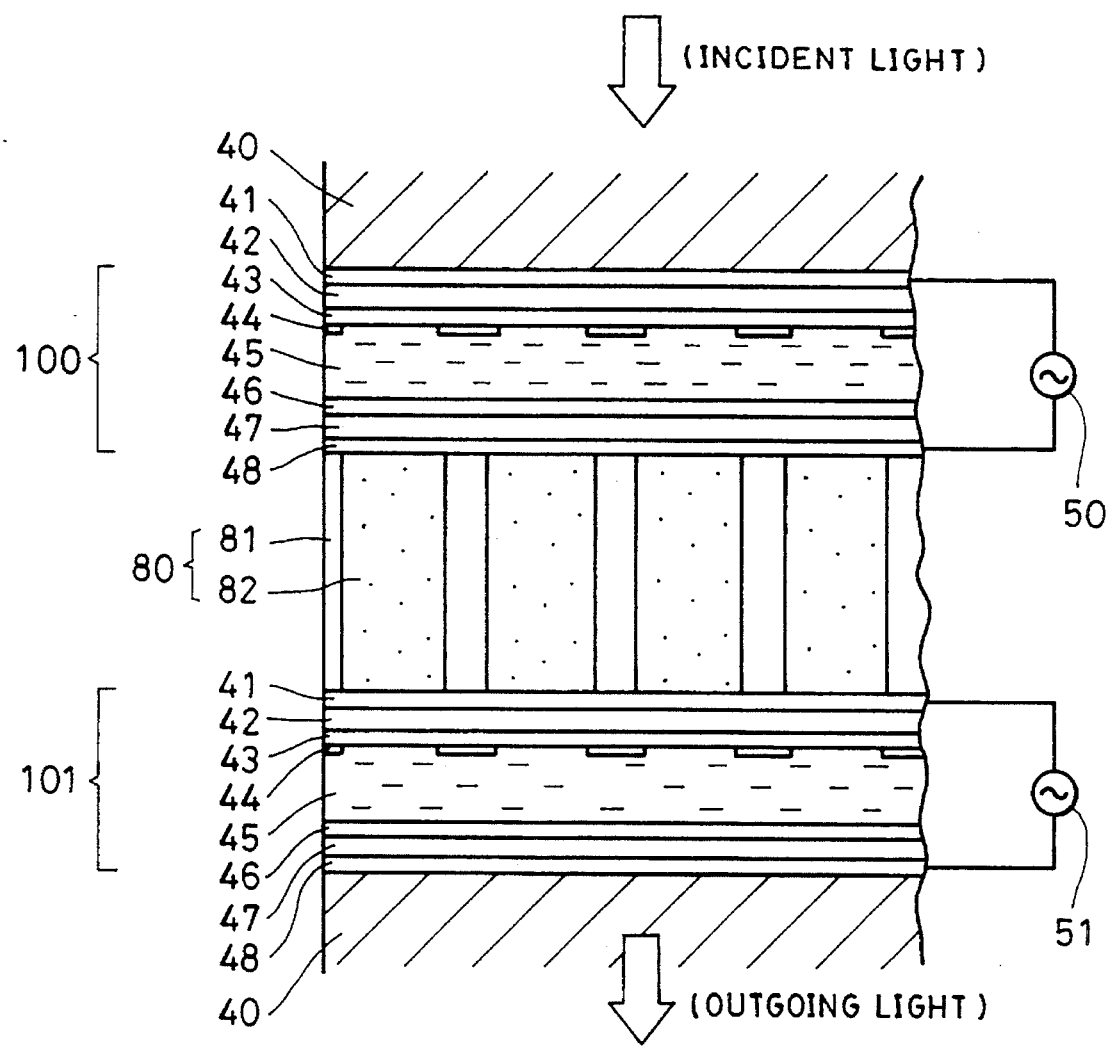
FIG. 5 is a sectional view of an optical modulating device according to a third embodiment of the present invention, illustrating a basic structure thereof.

FIG. 5 illustrates a third embodiment in which an optical means for preventing light leakage from one pixel to another and for preventing a decrease in the practical numerical aperture of the pixels is formed between the two liquid crystal layers in a liquid crystal cell constructed substantially the same as the cell shown in FIG. 1. In FIG. 5, numeral 80 denotes a film-like fiber plate composed of a low-refractive portion 81 and a high-refractive portion 82. One film-like fiber plate 80 is provided in an area corresponding to each of the pixels.

Source light from an illuminating device provided outside the liquid crystal panel (the whole system shown in FIG. 1) enters the transparent glass substrate 40 at zero or a very small incident angle. The light ray coming out through an area corresponding to a certain pixel in the first liquid crystal layer 100 enters an area of the film-like fiber plate 80 corresponding to the pixel, through which the light ray travels repeating total reflections at the boundary separating the high and low-refractive portions 82, 81. Then, the light ray coming out through the film-like fiber plate 80 travels through an area in the second liquid crystal layer 101, corresponding to the pixel, and finally it goes out of the other transparent glass substrate 40a, substantially without leaking into the neighboring pixels.

This embodiment provides advantages, in addition to the advantages provided by the first embodiment, in that it prevents light leakage from one pixel to another (interpixel cross-talk) and a decrease in the practical numerical aperture of the pixels. Both of the problems are difficult to avoid in a two LC layer panel structure where a transparent plate having a thickness of about 1 mm is sandwiched between two liquid crystal layers.

Figure 6:
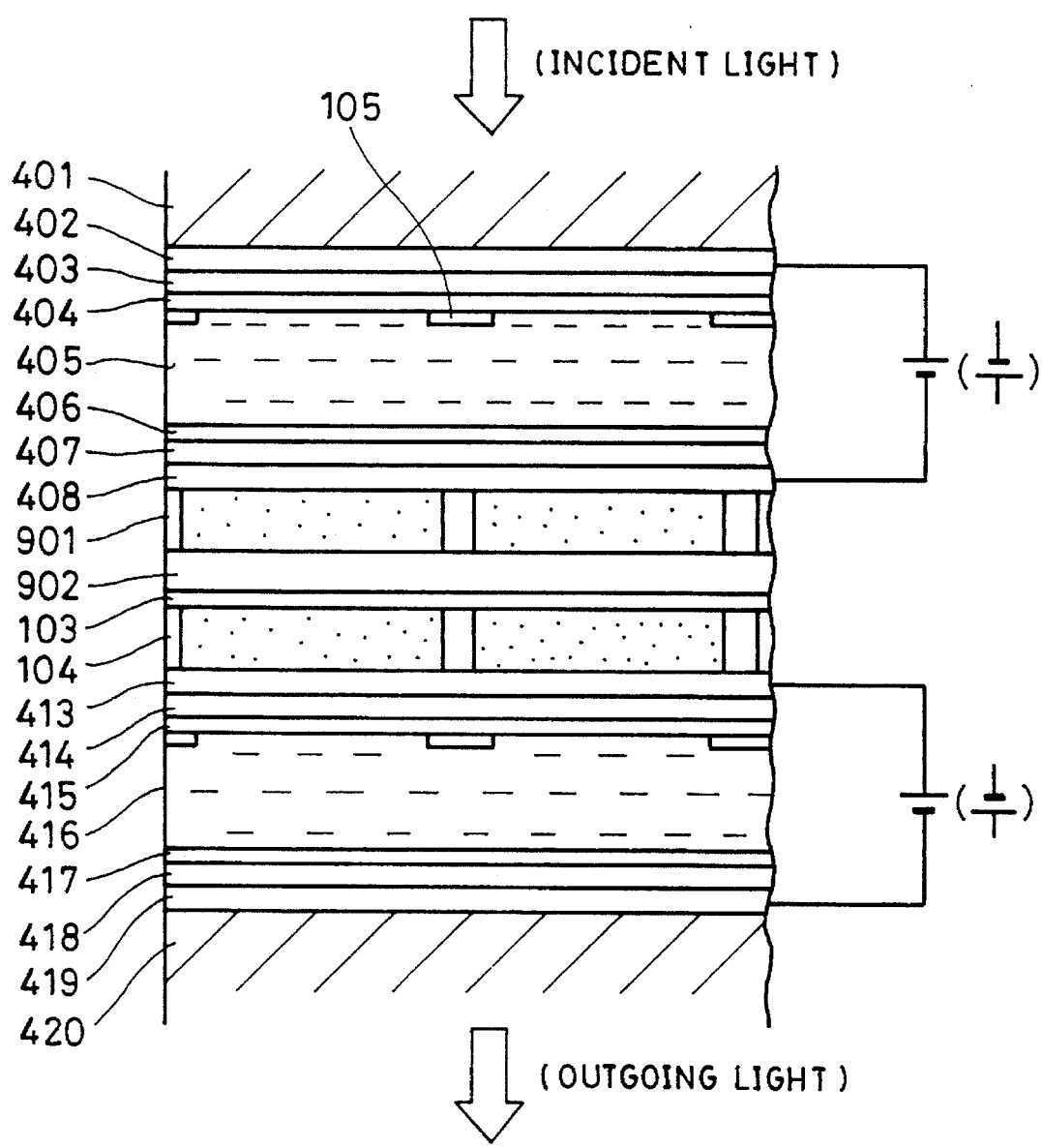
FIG. 6 is a sectional view of a liquid crystal display device according to a fourth embodiment of the present invention, illustrating a basic structure thereof.

With reference to FIG. 6, a liquid crystal device according to a fourth embodiment comprises: (from the incident-light side) a transparent glass substrate 401 (about 1 mm thick); a transparent ITO (indium tin oxide) film 402 (about 100 to 200 nm thick) which functions as an electrode; an insulating film (a $SiO_2$, $TiO_2$ or $Ta_2O_5$ film or the like having a thickness of about 100 to 200 nm) 403 for preventing a short circuit to the counter electrode; a polyimide film 404 (about 20 nm thick) rubbed for orientating ferroelectric liquid crystals (FLC); an FLC layer 405 injected into a gap maintained by beads (not shown) having grain sizes of 1 to 2 μm; a polyimide film 406, the same as the polyimide film 404; an insulating film (a $SiO_2$, $TiO_2$ or $Ta_2O_5$ film or the like having a thickness of about 100 to 200 nm) 407 for preventing a short circuit to the counter electrode; the electrode 408 counter to the ITO film 41 (about 100 to 200 nm thick); a fiber plate 901; a high molecular liquid crystal layer 902 (2 μm thick or less) having anisotropy of refraction index and having an effect equivalent to that of a half-wavelength plate; a polyimide film 404 (about 20 nm thick) rubbed for facilitating the orientation of the high molecular liquid crystals; a fiber plate 104; an ITO film 413, substantially the same as the ITO film 402; an insulating layer 414, substantially the same as the insulation layer 403; a polyimide film 415, substantially the same as the polyimide film 404; an FLC layer 416, substantially the same as the FLC layer 405; a polyimide film 417, substantially the same as the polyimide film 404; an insulating layer 418, substantially the same as the insulating layer 403; an electrode 419 counter to the ITO film 413; a glass substrate 420 (about 1 mm); and protruding portions 105 of TFT (thin film transistor).

Figure 7:
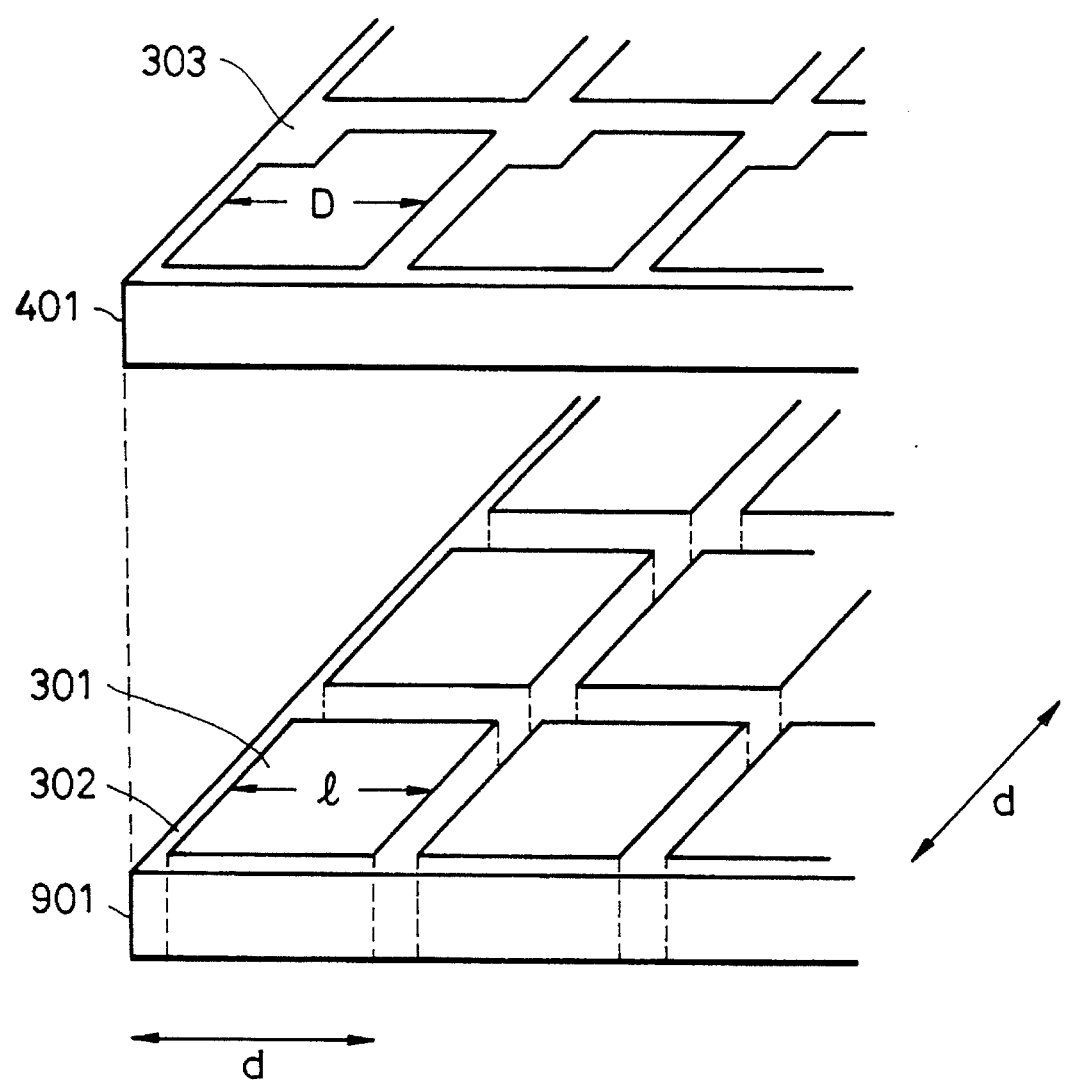
FIG. 7 is a perspective view of the device shown in FIG. 6.

In FIG. 7, there are shown: a matrix-like shading portion 303 formed of metallic film made of, for example, aluminum or chrome; high-refractive portions 301 in the fiber plate 901; a low-refractive portion 302 in the fiber plate 901. Numeral d denotes the width of a display unit area containing a pixel. The high-refractive portions are cubics having a side of 1 equal to the length D.

The fourth embodiment will be further described with reference to FIGS. 6 and 7. Source light from an illuminating device provided outside the liquid crystal panel (the whole system shown in FIG. 6) enters the transparent glass substrate 401 at zero or a very small incident angle. The light ray coming out through an area in the FLC layer 405, i.e., an area corresponding to a certain pixel, enters an area corresponding to the pixel in the fiber plate 90, through which the light ray travels repeating total reflections at the boundary separating the high and low-refractive portions 301, 302. Then, the light ray coming out through the fiber plate 904 travels through an area corresponding to the pixel in the FLC layer 416, and finally it goes out of the other transparent glass substrate 420, substantially without leaking into the neighboring pixels (interpixel cross-talk).

For example, when the angle between incoming light and the optical axis of the fiber plate 901 is +−3°, the above effect can be obtained if, due to the condition of the total reflection, the high and low-refractive portions 301, 302 distributed in the fiber plate 901 have the following refractive ratio :

$o < ne/nh \leq sin 87°$ where ne and nh are refractive indexes of the low and high-refractive portions 302, 301, respectively.

The materials of the fiber plate are normally glass which can provide the above refractive ratio, but may also be plastic or other materials having the same effect.

The shape of the high-refractive portions 301 may be a cylinder having a diameter 1 of D<l<d. In such a case, the effects, a decrease in the incidence of interpixel cross-talk and an increase in the practical numerical aperture, become a little less than in the above embodiment having cubic high-refractive portions, but are still sufficiently better than in the conventional art (particularly the decrease in the incidence of interpixel cross-talk is substantial).

One example method for producing the above fiber plate is as follows. Single fibers are modified by, for example, the pipe-rod method so as to have a desired diameter. Next, a great number of these fibers are piled in a die made of a metal or carbon, and then are subjected to a high temperature and high pressure. After the material fused by the high temperature and pressure has been cooled and taken out out of the die, the material is cut and polished by a normal method used for glass. In this way, the fiber plate, i.e., the optical means in a device according to the present invention, is produced.

In addition to reducing the interpixel cross-talk and preventing a decrease in the practical numerical aperture, this embodiment substantially facilitates production since the optical device having double refractive indexes in this invention has to satisfy only the total reflection condition whereas a usual lens with two or more refractive indexes requires a precise control of the refractive index distribution for the image formation.

The fiber plates are made in substantially the same manner in all the embodiments.

Figure 8:
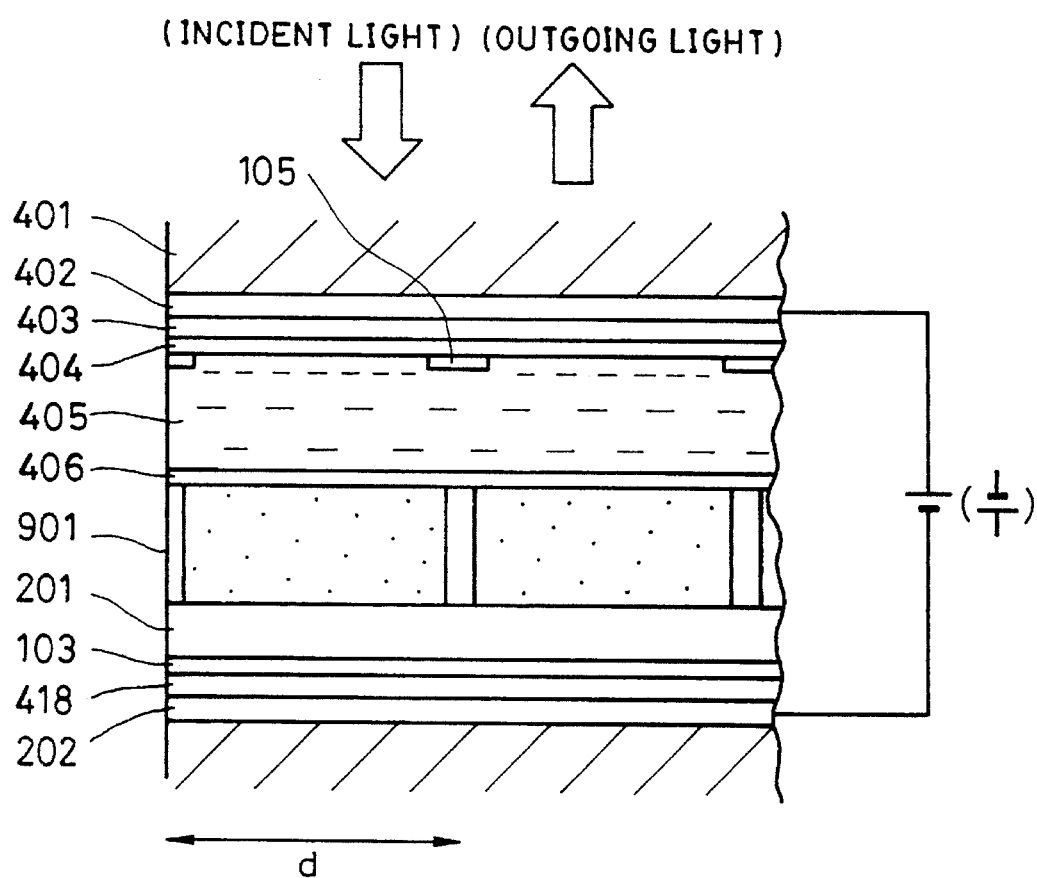
FIG. 8 is a sectional view of a liquid crystal display device according to a fifth embodiment of the present invention, illustrating a basic structure thereof.

FIG. 8 illustrates a reflecting type liquid crystal display device according to a fifth embodiment of the present invention. This embodiment is modified from the fourth embodiment shown in FIGS. 6 and 7. In FIG. 8, a high molecular liquid crystal layer 201 (1 μm thick or less) has an anisotropy of refractive index and provides an effect corresponding to a quarter-wavelength plate, and an aluminium vapor-deposited film 202 reflects light and functions as an electrode counter to the ITO film 402. The other parts are already referred to by the same numerals and names in the description of the fourth embodiment.

The fiber plate in this embodiment is made substantially the same way as in the fourth embodiment shown in FIG. 6 and provides substantially the same effect when it is used as the optical means.

Figure 9:
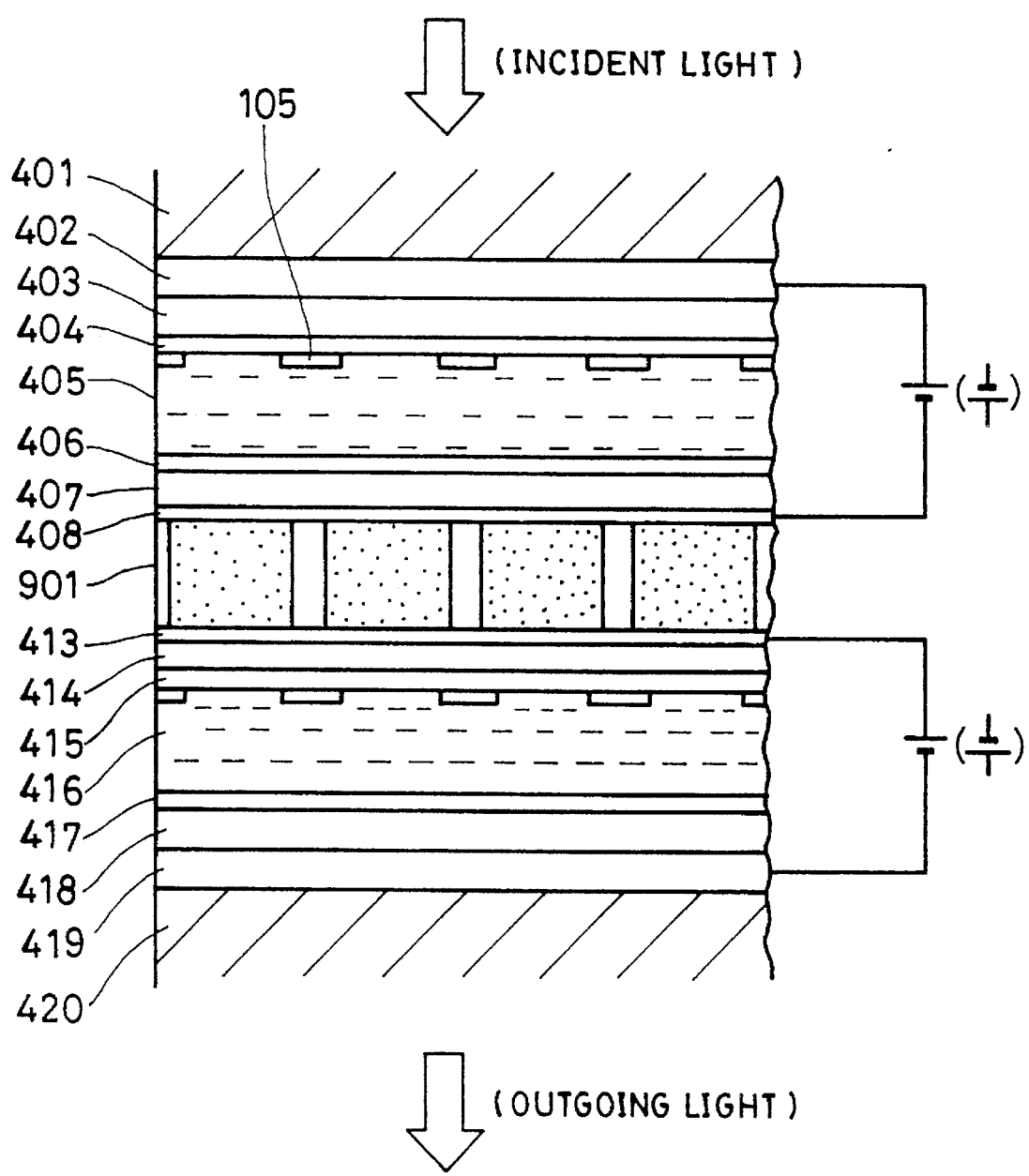
FIG. 9 is a sectional view of a liquid crystal display device according to a sixth embodiment of the present invention, illustrating a basic structure thereof.

FIG. 9 illustrates a liquid crystal display device according to a sixth embodiment of the present invention. The parts are referred to by the same numerals and names as in FIG. 6. The alignment direction of the ferroelectric liquid crystal (FLC) molecules in a first FLC layer 405 is perpendicular to that in a second FLC layer 416. The FLC molecules in the first and second layers have their oriented rotation directions opposite to each other. A fiber plate 901 has the same effect as in the fourth embodiment.

As in the fourth embodiment, this embodiment is designed to have the maximum ON/OFF light transmission ratio when the cone angle θc is 11.25°. Thus, the embodiment provides the same effect as the fourth embodiment.

The above embodiments using FLCs are only illustrative and do not restrict the invention. For example, a display device comprising more than two optical modulating device each of which includes a plurality of display unit areas may be combined with the fiber plate, providing substantially the same effect.

Figure 10:
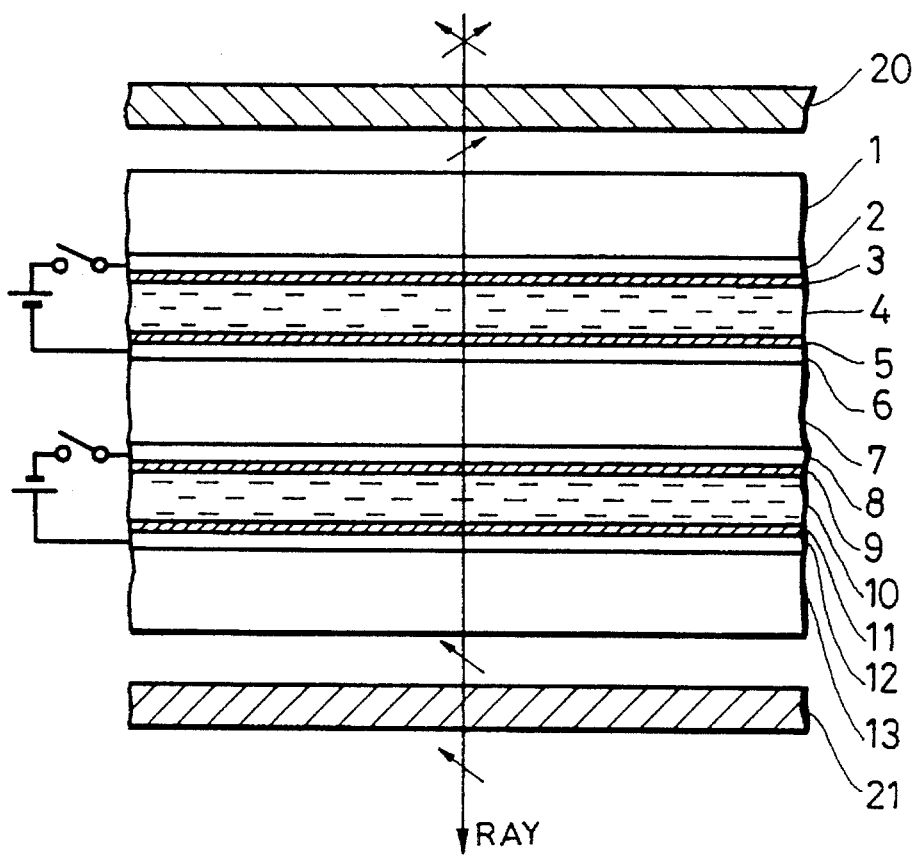
FIG. 10 is a sectional view of an FLC device according to seventh embodiment of the present invention, illustrating the layered structure thereof.

FIG. 10 illustrates an FLC device according to a seventh embodiment of the present invention. In FIG. 10, each of first and second FLC layers 4, 10 has a thickness corresponding to a half-wavelength plate. On both sides of the first FLC layer 4 are orientation films 3 and 5, on the opposite sides of which are ITO electrodes 2 and 6. In the same way, on both sides of the second FLC layer 10 are orientation films 9 and 11, on the opposite sides of which are ITO electrodes 8 and 12. The orientation film 3 and the ITO electrode 2 are formed on the surface of a glass substrate 1. The orientation films 5, 9 and the ITO electrodes 6, 8 are formed on both surfaces of a glass substrate 7. The orientation film 11 and the ITO electrode 12 are formed on a glass substrate 13. A polarizer 20 and an analyzer 21 are provided outside the glass substrates 1 and 13, respectively. The orientation films 3, 5 are rubbed on the first FLC layer 4 in a direction different from that of rubbing of the orientation films 9, 11 on the second FLC layer 10; thus, when an electric field is not applied, the FLC molecules in the first FLC layer 4 are oriented in the direction 14 in FIG. 11 and the FLC molecules in the second FLC layer 10 are in the direction 15. The polarized light transmission of the polarizer is in the direction 14, and that of the analyzer 21 is in the direction 15.

In FIG. 10, incoming light is linearly polarized by the polarizer 20 and then enters the first FLC layer 4, where the light is not rotated by the double refraction because the FLC molecules there are oriented in the same direction as the polarization of the incoming light is. In the second FLC layer 10, the incoming light is not rotated either because the FLC molecules there are oriented perpendicularly to the direction of polarization of the incoming light. Thus, without being affected by the two FLC layers, the light reaches the analyzer 21, where it is completely blocked because the polarized light transmission of the analyzer 21 is in the direction 15, i.e., perpendicular to the polarization of the incoming light. Thus, the transmission is in the OFF state in this case, i.e., when an electric field is not applied.

When an electric field (of a predetermined level) is applied between the ITO electrodes 2 and 6 and is also applied in the opposite direction between the ITO electrodes 8 and 12, the FLC molecules in the first and second FLC layers 4, 6 are oriented or tilted in opposite directions. In this embodiment, FLC material and orientation films which provide a tilt angle θT of 22.5° are used, so that the FLCs in the first FLC layer 4 tilt $\theta_T$ (=22.5°) clockwise from the orientation direction 14 to 14' whereas the FLCs in the second FLC layer 10 tilt $\theta_T$ (=22.5°) counterclockwise from the orientation direction 15 to 15', or vice versa.

When light comes into the device in such a state, the light is linearly polarized in the direction 14 by the polarizer 20 and then enters the first FLC layer 4. As the polarized light goes through the first FLC layer 4 where the FLC orientation is tilted in the direction 14' ($\theta_T$=22.5°), the polarization plane is rotated $2\theta_T$ (=45°) clockwise, i.e., to the direction 16 in FIG. 11, by the double refraction. Next, as it goes through the second FLC layer 10 where the FLC orientation is tilted in the direction 15', the polarization plane is rotated by the double refraction 2×{(90°- $2\theta_T$) - $\theta_T$}=$2\theta_T$ (=45°) clockwise to the direction 15. Thus, the polarized light passes through the analyzer 21 without being affected. In this way, the transmission is in the ON state when an electric field is applied.

As described above, linearly polarized light can be rotated 90° even though the orientation tilt angle in each of the FLC layers is only 22.5°. Thus, this embodiment can utilize light at the maximum efficiency for a double refraction mode device.

This embodiment can be directly applied to a type of FLC whose tilt angle can be set at an intermediate level (the maximum is 22.5°) according to a driving condition such as electric field strength or driving pulse width, providing intermediate levels of light transmission between the ON and OFF states, according to the tilt angles.

The present invention is not restricted by the above embodiment, but may be modified or developed, for example, as follows:
1. The first and second FLC layers are provided in different devices, which are combined (i.e., layered).
2. The first and second FLC layers are designed to be controlled by the same driving system; for example, the ITO electrodes 2 and 12 are interconnected to be one electrode, and the ITO electrodes 6 and 8 are interconnected by through-holes to be pixel electrodes, which are driven by TFTs.

An optical modulating device according to the present invention, in which polarization, scattering or transmission of light is changed by controlling the applied electric field, comprises a two-layer structure of controlled portions and a voltage applying means for applying alternately a display signal and a non-display signal in a constant cycle and periods to each of the controlled layers so that the layers experience opposite phases. Therefore, a reproduced image will provide the same level of brightness as an image reproduced by a driving method without a non-display signal unit. Also, progressive deterioration in the average luminance of a liquid crystal layer can be reduced.

When the present invention is applied to a monostable FLC, a device having high transmittance, high speed, high density and multi-graduations can be provided.

Since two FLC layers having different orientation directions are provided, the tilt angle of the whole device can be raised, at maximum, to the sum of the tilt angles in the two FLC layers by tilting or driving the FLC molecules in the two layers in opposite directions, and thus light-utilizing efficiency can be raised to exactly or nearly the maximum for a double refraction mode device by setting the summed tilt angles at exactly or nearly 45°. When the FLC molecules in the two FLC layers are aligned at 90° to each other and can be driven in the opposite directions, in particular, the light-utilizing efficiency reaches the maximum for a double refraction mode device.

Also, since a fiber plate, the optical means, includes a section (corresponding to each display unit area) having two portions: one with high and the other with low refractive index, incidence of the light leakage between pixels (the interpixel cross-talk) can be reduced and a decrease in the practical numerical aperture can be prevented.

Figure 11:
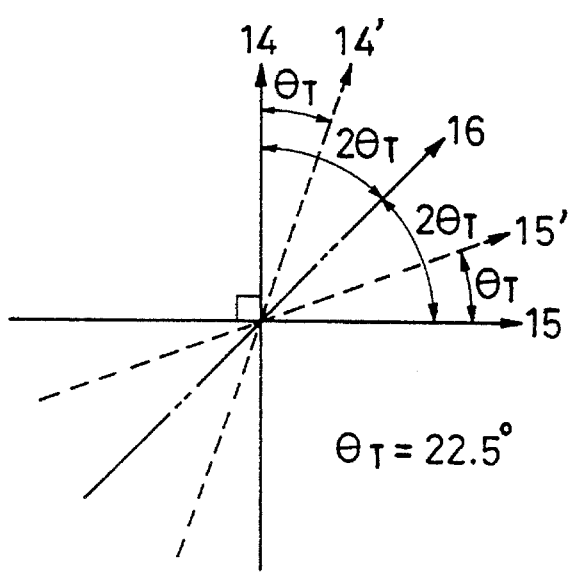
FIG. 11 illustrates the operation principle of the FLC device shown in FIG. 10.
Figure 12:
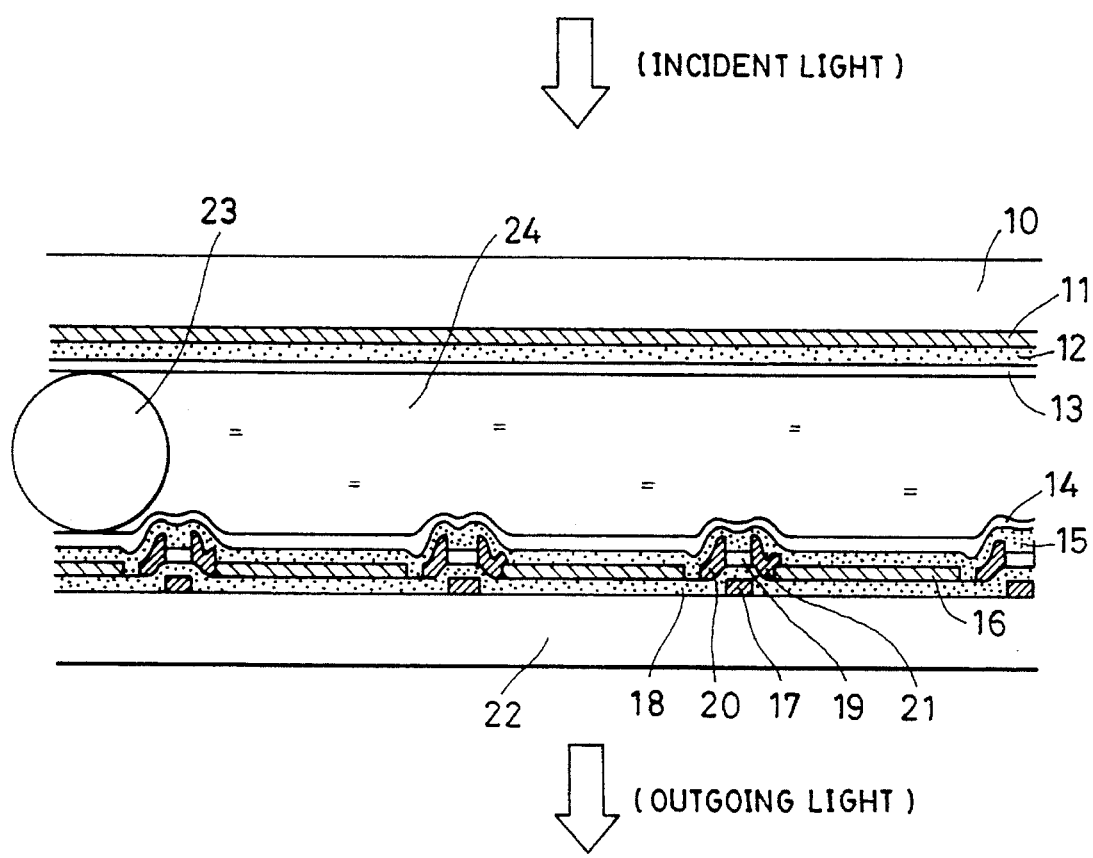
FIG. 12 is a sectional view of a conventional optical modulating device, illustrating a basic structure thereof.

Particularly in the device shown in FIGS. 10 and 11, the tilt angle of the whole device can be raised, at maximum, to the sum of the tilt angles in the two FLC layers by appropriately setting the alignment and tilting directions of the FLC molecules in the two FLC layers. If the tilt angle in each FLC layer is 22.5° or greater, the summed tilt angle of 45° can be provided so that the rotation of the polarization plane will be 90°, thus providing the maximum light-utilizing efficiency. In this way, the light-utilizing efficiency can be raised to the maximum for a double refraction mode device in spite of the small tilt angle in each FLC layer. Even when the tilt angle in each FLC layer is less than 22.5°, the summed tilt angle can be closed to 45°, thus raising the light-utilizing efficiency close to the maximum level for a double refraction mode device.

What is claimed is:
1. A liquid crystal device, comprising:
   a) two liquid crystal cells parallel to each other, each of which exhibits monostable molecular orientation of chiral smectic liquid crystal, wherein the directions of said monostable molecular orientation of each liquid crystal cell are substantially in one direction;
   b) each of said liquid crystal cells comprising:
      a plurality of thin film transistors having gates and sources, said thin film transistors being aligned on a plurality of scanning electrodes and signal electrodes,
      gate leads connected to the gates of the thin film transistors aligned on said scanning electrodes,
      source leads connected to the sources of the thin film transistors aligned on said signal electrodes,
      a first substrate having drain electrodes connected to said thin film transistors,
      a second substrate having a transparent electrode counter to said drain electrodes;
   c) a polarizer and an analyzer, wherein the optical axis of said polarizer is substantially parallel to the optical axis of said liquid crystal in said monostable molecular orientation and the optical axis of said analyzer is substantially perpendicular to the optical axis of said polarizer;
   d) a voltage applying means which applies a gate-on-pulse to said gate leads provided in both of said cells;
   e) a voltage applying means which applies rectangular signal voltages synchronized with said gate-on-pulse for source leads of said two liquid crystal cells,
   wherein (i) optical axes of said two liquid crystal cells are both in said monostable molecular orientation to obtain one transmission state, (ii) optical axes of only one of said two liquid crystal cells are in said monostable molecular orientation to obtain another transmission state, and (iii) phases of the rectangular signal voltages applied to said two liquid crystal cells to obtain said another transmission state are inverse to each other.

2. A liquid crystal device according to claim 1, wherein said thin film transistors include an amorphous silicon film.

3. A liquid crystal device according to claim 1, wherein said thin film transistors include a polysilicon film.

4. A liquid crystal device according to claim 1, wherein said rectangular signal voltage applying means includes a means for applying AC voltage to said source lead provided in one of said cells.

5. A liquid crystal device according to claim 1, wherein said rectangular signal voltage applying means includes a means for applying AC voltage to said source leads provided in both of said cells.

6. A liquid crystal device according to claim 1, wherein said chiral smectic liquid crystals do not form helical structures.

7. A liquid crystal device comprising:
   two active matrix liquid crystal cells parallel to each other, each of which exhibits monostable molecular orientation of chiral smectic liquid crystal, wherein the direction of said monostable molecular orientation of each liquid crystal cell are substantially in one direction;
   a polarizer and an analyzer, wherein the optical axis of said polarizer is substantially parallel to the optical axis of said liquid crystal in said monostable state, and the optical axis of said analyzer is substantially perpendicular to the optical axis of said polarizer, wherein one transmission state is obtained when both of said liquid crystal cells are in a monostable state, and a second transmission state is obtained when only one of said liquid crystal cells is in a monostable state; and
   voltage applying means for applying voltage to said liquid crystal cells, said voltage applying means providing a first voltage of one polarity to one of said liquid crystal cells in a first period, and a second voltage of said one polarity to the other of said liquid crystal cells in a second period subsequent to said first period.

* * * * *

UNITED STATES PATENT AND TRADEMARK OFFICE
CERTIFICATE OF CORRECTION

PATENT NO. : 5,495,351

DATED : February 27, 1996

INVENTOR(S): JUNKO SHINGAKI ET AL.

It is certified that error appears in the above-identified patent and that said Letters Patent is hereby corrected as shown below:

DRAWING Sheet 11

Figure 13:
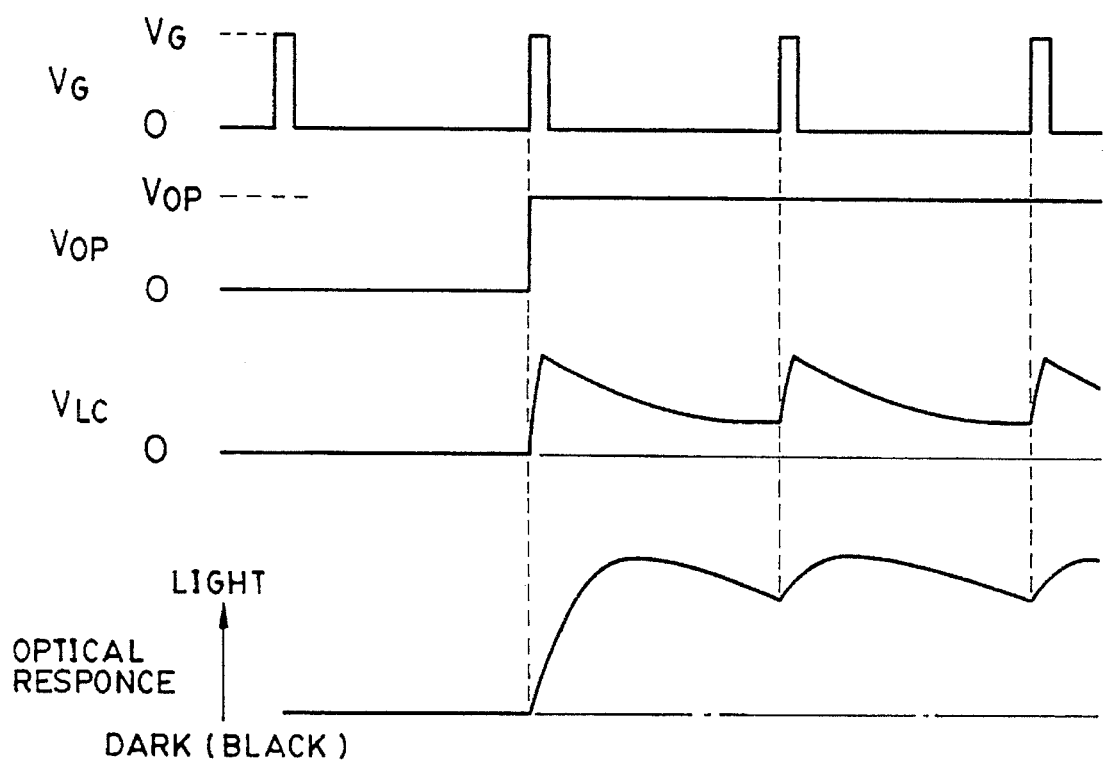
FIG. 13 shows one example of waveforms of the applied voltage in the device shown in FIG. 12.
Figure 14:
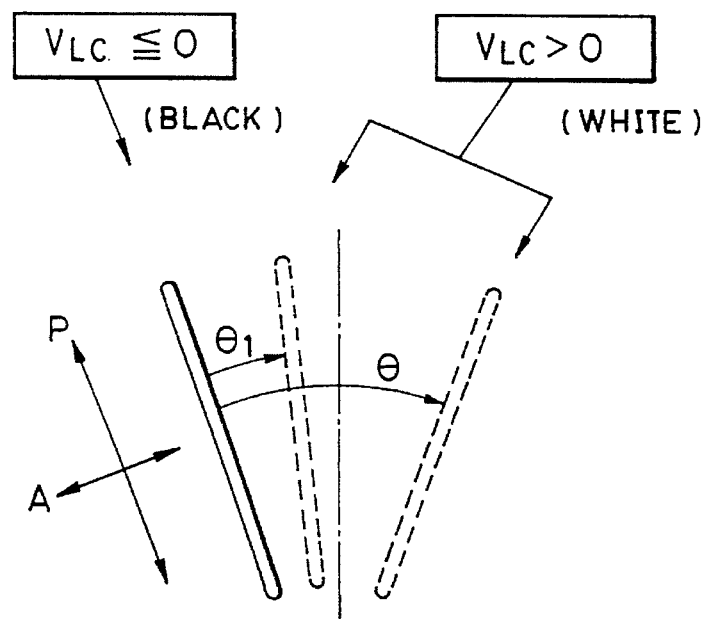
FIG. 14 illustrates the molecular orientation in the device shown in FIG. 12.

Line FIG. 13, "RESPONCE" should read --RESPONSE--.

COLUMN 2

Line 52, "FIG. 4." should read --FIG. 4);--.

COLUMN 3

Line 67, "occurs," should read --occur,--.

COLUMN 4

Line 6, "is" (second occurrence) should be deleted.

COLUMN 8

Line 55, "+ 3°," should read --+/-3°,--.

UNITED STATES PATENT AND TRADEMARK OFFICE
CERTIFICATE OF CORRECTION

PATENT NO. : 5,495,351

DATED : February 27, 1996

INVENTOR(S) : JUNKO SHINGAKI ET AL.

It is certified that error appears in the above-identified patent and that said Letters Patent is hereby corrected as shown below:

COLUMN 9

Line 14, "out" (second occurrence) should be deleted.

COLUMN 10

Line 52, "$2 \times \{(90° - 2\theta_r) - \theta_r\} = 2\theta_r (=45°)$" should read
--$2 \times \{(90° - 2\theta_r) - \theta_r\} = 2\theta_r (=45°)$--.

Signed and Sealed this

Sixteenth Day of July, 1996

Attest:

BRUCE LEHMAN

Attesting Officer

Commissioner of Patents and Trademarks